No. 748,547. PATENTED DEC. 29, 1903.
T. WENGER.
KNIFE.
APPLICATION FILED SEPT. 26, 1902.
NO MODEL
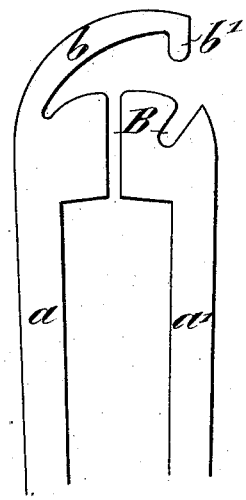
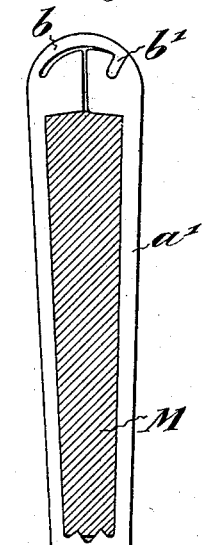
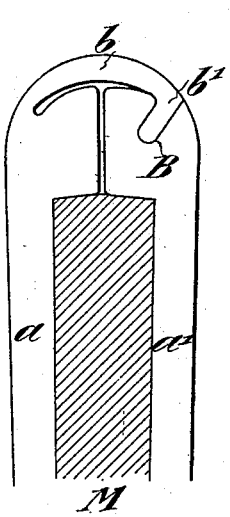
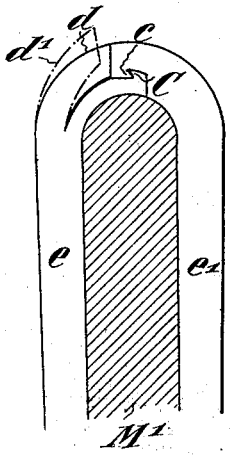
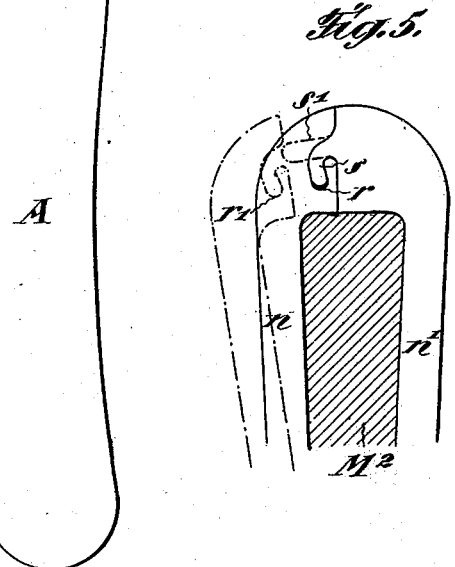
Witnesses:
H. M. Kuehne
Otto nerunk
Inventor:
Theodor Wenger
by Richardson
Attorneys No. 748,547.

Patented December 29, 1903.

UNITED STATES PATENT OFFICE.

THEODOR WENGER, OF DÉLÉMONT, SWITZERLAND.

KNIFE.

SPECIFICATION forming part of Letters Patent No. 748,547, dated December 29, 1903.

Application filed September 26, 1902. Serial No. 124,975. (No model.)

*To all whom it may concern:*

Be it known that I, THEODOR WENGER, a citizen of the Republic of Switzerland, and a resident of Délémont, canton of Berne, Switzerland, have invented a new and useful Improvement in Knives, of which the following is a specification.

In knives the blade is secured to the handle either by a tailpiece of the blade fitted either by force or cemented or glued inside the handle of wood, bone, or other material or by a lengthening of the blade of the same size as the handle and on which both sides of said handle are secured by screws, pins, rivets, &c. There is still another way of putting together blade and handle, which is to have the blade lengthened into two branches, entering into two corresponding grooves of the handle, a hook keeping together the ends of both branches. The latter system, although already preferable to the others, has nevertheless several inconveniences coming from the difficulty in maintaining suitably at the same time both hooks in the branch ends.

The knife for which I desire to secure Letters Patent has only two main parts—the blade with its branches made of one piece of metal and the handle. The ends of the branches are fitted one into the other in tightening the handle without the help of a special hook. Such a knife in one form is represented in the annexed drawings, given as an example, and in which—

Figure 1 shows a complete knife, the handle of which is cut so as to show the blade with both ends together. Figs. 2 and 3 show the end of both branches before and after their being hooked together. Figs. 4 and 5 show two different ways of hooking the two branches.

The blade A is ended by two branches $a\ a'$, inserted into two corresponding grooves of the handle M. The end of the branch $a$ is formed with a hook $b$, Fig. 2, while the end of the branch $a'$ has a slit B, suitably shaped and of the same dimensions as those of the end $b'$ of the hook. The fitting of the handle is obtained in a simple manner. The two branches $a\ a'$ being drawn apart, the handle M is placed between them. Then while tightening the two branches the hook $b$ is bent over by means of some suitable tool and the end $b'$ of said hook forced to enter into the slit B, thus tightly holding the handle M between the two branches $a\ a'$, as shown in Figs. 1 and 3.

The shape of the hook and slit may vary, as shown in Figs. 4 and 5. In Fig. 4 the hook $c$ is introduced into the hook-recess C, the projection $d$ being in the position shown by dotted lines $d'$, and after the hook $c$ is thus engaged the projection $d$ is forced down, as shown in dotted lines, to prevent the hook $c$ from leaving the recess C, thus securely holding the parts locked. The handle in this figure is shown at M'. When the hook $c$ is fastened into the slit C, the projection $d$ is bent against the hook $c$, as shown in full lines in said Fig. 4, the fitting of the two branches together being thus secured. In the example shown in Fig. 5 the branch $n'$ is provided with a finger $s$ and the branch $n$ with a slit $r$. Both branches being drawn apart, as already said, and the handle $M^2$ introduced between them, it will only be necessary to tighten firmly with pincers or any other suitable tool the end of both branches one against the other, so that the finger $s$ may enter into the slit $r$. In said Fig. 5 the position of the finger $s$ and slit $r$ before the tightening process is shown in dots in $s'$ and $r'$. In forcing the finger $s$ into place it bends to conform to the slit $r$.

Many other shapes may be given to the end of the branches so as to insure their junction, the principle of the invention remaining the same. The materials used for the manufacture of such knives, as well as the dimensions of the several parts of the latter's handle or blade, may vary.

Having thus described my invention, I declare that what I wish to secure by Letters Patent, is—

1. In combination, with a handle, a blade having two branches, one of which has a recess, the walls of which are at an inclination to the longitudinal axis of the handle and the other of said branches having a tongue which when forced into the said recess is bent from its position by the inclined walls so as to occupy the said inclined recess, substantially as described.

2. In combination a handle, a knife-blade having two branches with faces abutting at the end of the handle, said faces extending in a direction longitudinally of the handle, one of said branches having a recess in its edges to one side of the abutting face and the other branch having a hook extending transversely across the meeting line of the abutting faces and having a projection extending into the said recess, said abutting faces being on the main parts of the branches independent of the hook, substantially as described.

In witness whereof I have hereunto set my hand in presence of two witnesses.

THEODOR WENGER.

Witnesses:
LEO J. FRANKENTHAL,
P. L. BROWN.